United States Patent [19]

Haage et al.

[11] Patent Number: 4,968,199
[45] Date of Patent: Nov. 6, 1990

[54] EXPANSIBLE PLUG TO BE PERCUSSION ANCHORED IN A BOREHOLE THAT TAPERS OUTWARD AT AN INNER END THEREOF

[75] Inventors: Manfred Haage; Artur Fischer, both of Tumlingen, Fed. Rep. of Germany

[73] Assignee: Fischerwerke Artur Fischer GmbH & Co. KG, Waldachtal/Tumlingen, Fed. Rep. of Germany

[21] Appl. No.: 417,804

[22] Filed: Oct. 5, 1989

[30] Foreign Application Priority Data

Oct. 5, 1988 [DE] Fed. Rep. of Germany ....... 3833774

[51] Int. Cl.$^5$ .................. F16B 13/04; F16B 13/06
[52] U.S. Cl. .......................... 411/39; 411/60
[58] Field of Search ............. 411/39, 40, 41, 45, 411/44, 60, 61, 62, 21, 448, 449

[56] References Cited

U.S. PATENT DOCUMENTS 4,402,637  9/1983  Seghezzi et al. ............ 411/39
4,673,320  6/1987  Froehlich ..................... 411/39
4,696,423  9/1987  Ryan .......................... 411/21

FOREIGN PATENT DOCUMENTS 0056255   7/1982  European Pat. Off. .
3006480   8/1981  Fed. Rep. of Germany .
3020907  12/1981  Fed. Rep. of Germany .
3111241   9/1982  Fed. Rep. of Germany .
3622937   1/1988  Fed. Rep. of Germany .
2137301  10/1984  United Kingdom .

Primary Examiner—Neill R. Wilson
Attorney, Agent, or Firm—Michael J. Striker

[57] ABSTRACT

An expansible plug to be percussion anchored in a borehole that tapers outward at an inner end thereof comprising an expansible sleeve, expansible segments arranged at an expandable end of the expansible sleeve, an expander member for penetrating into a converging inner bore of the expansion sleeve to expand the expansible segments, and at least one spacing element arranged at an end side of the expansible segments.

6 Claims, 1 Drawing Sheet

EXPANSIBLE PLUG TO BE PERCUSSION ANCHORED IN A BOREHOLE THAT TAPERS OUTWARD AT AN INNER END THEREOF

BACKGROUND OF THE INVENTION

The invention relates to an expansible plug to be percussion anchored in a borehole that tapers outward at an inner end thereof.

Expansible plugs of the kind mentioned above are known. Such an expansible plug is anchored in a borehole, a widened end of which forms an undercut in the region of the bore bottom, by driving an expander bolt into an expansible sleeve of the expansible plug.

An expansible plug to be percussion anchored in a borehole with an undercut is disclosed in DE-OS 30 20 907. An expansible plug to be anchored in a borehole with an undercut has to be expanded to a greater degree than an expansible plug anchorable in a cylindrical borehole. To provide for greater expansion of the expansible plug anchorable in a borehole with an undercut, the front end of the expander bolt which is opposite to the bolt end subjected to percussions, is rounded, and the neck portion of the borehole is provided with a very marked taper. Up to now known solutions of anchoring of expansible plugs in boreholes with an undercut often failed to insure a reliable conical fixation because the expansible plug became fixed in the bottom of the borehole and could not, therefore, expand. An optimal anchoring of the expansible plug in a borehole with an undercut could only be achieved by providing an expansible plug the expandable portion of which forms a form-locking fixation with the borehole undercut upon expansion of the plug.

SUMMARY OF THE INVENTION

The object of the invention is to provide an expansible plug to be reliably percussion anchored in a borehole that expands towards its inner end to form an undercut, that is to provide an expansible plug the expanded portion of which forms a form-locking fixation with the undercut. The object of the invention is achieved by providing at least one spacing element at the front end side of the expansible segments arranged at the expansible end of the expansible sleeve. The spacing element strikes against the bore bottom during the percussion operation and is deformed as a result of forces being applied to the expansible plug. Upon its deformation, the spacing element expands the expansible segments until they form a form-locking connection with the undercut of the borehole.

The spacing element comprises a plurality of bend elements which surround the opening of the inner bore defined by the front end side of the expansible segments, and form a continuation of the inner edge of this opening or a continuation of outer edges of the front end side of the expansible segments. In the later case, the bend elements converge axially and contact each other at their front ends. When these bending elements strike against the bottom of the borehole, they exert a counter-pressure on the expansible segments and cause their expansion until a form-locking fixation in the conical portion of the borehole is achieved.

Bending of the bend element and expansion of the expansible segments is facilitated by indentations formed at the area where the bend elements adjoin the expansible segments and in the junction area of the expansible segments with the expansible sleeve.

According to an advantageous embodiment of the invention, the spacing element is formed as a plastic spacing washer having tongues that project into an opening at the front end side of the expansible segments. When the plastic spacing washer strikes against the bottom of the borehole, it exerts a counter-pressure on the expansible segments while insuring that the expansible plug is not fixed in the bottom. At its front end, the plastic spacing washer has a recess in which drilling dust is collected. The tongues have a predetermined rupture point at which they severe during percussion, thus insuring complete penetration of the expander bolt into the inner bore of the expansible sleeve.

A percussion tool for anchoring the expansible plug comprises a conical marker head from which the punch for impacting the expander bolt projects. The length of the punch is so selected that the marker head strikes the edge of the rear end opening of the inner bore of the expansible sleeve when the anchoring process is completed, thus providing an indication of the proper anchoring of the expansible plug in the borehole.

The present invention both as to its construction so to its mode of operation, together with additional objects and advantages thereof, will be best understood from the following detailed description of specific embodiments when read in connection with the accompanying drawings.

BRIEF DESCRIPTION OF THE DRAWINGS

FIG 4 shows a partial view of another embodiment of the spacing element shown in FIG. 2.

DESCRIPTION OF THE PREFERRED EMBODIMENTS

Figure 1:
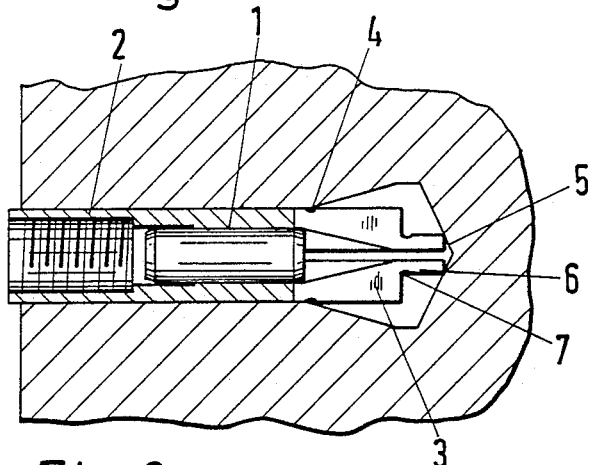
FIG. 1 shows a cross-sectional view of an expansible plug according to the invention with a spacing element which surrounds the internal bore of the sleeve of the expansible plug.

A percussion anchorable expansible plug shown in FIG. 1 comprises a sleeve 2 having an internal bore 1 and expandable segments 3 at an end of the sleeve. Indentations 4 formed in the junction area of the expandable segments with the sleeve, facilitate expansion of the expansible segments 3. At end sides of the expansible segments facing the borehole bottom, there is provided a spacing element formed of bend webs 6. The webs 6 surround the opening of the internal bore 1 of the sleeve 2 and form an axial continuation of an edge thereof. At the junction points of the webs 6 with the expansible segments 3, there is provided a notch 7 which facilitates bending of the bend webs. Upon striking of the borehole bottom 5 by the expansible plug, the bend webs bend causing expansion of the expansible segments which engage the conical portion of the borehole in a form-locking connection.

Figure 2:
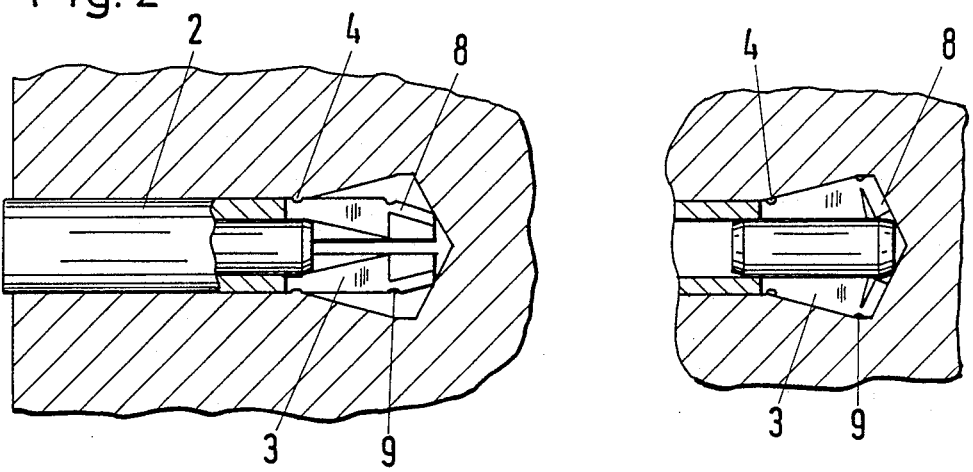
FIG. 2 shows a partially cross-sectional view of an expansible plug according to the invention with a spacing element arranged at outer edges of the expansible segments.

FIG. 2 shows another embodiment of an expansible plug comprising an expansible sleeve 2 with expansible segments 3 arranged at an end thereof. The indentations 4 facilitate expansion of the expansible segments. The webs 8 that form the spacing element, adjoin the outer edges of the expansible segments 3. A notch 9 formed between the expansible segments 3 and webs 8, also facilitate bending as discussed with reference to FIG. 1. The webs 8 converge axially and may contact each other at their front ends.

FIG. 4 shows an embodiment similar to that of FIG. 2 but wherein the webs 8 extend at a greater angle to the longitudinal axis of the expansible plug.

Figure 3:
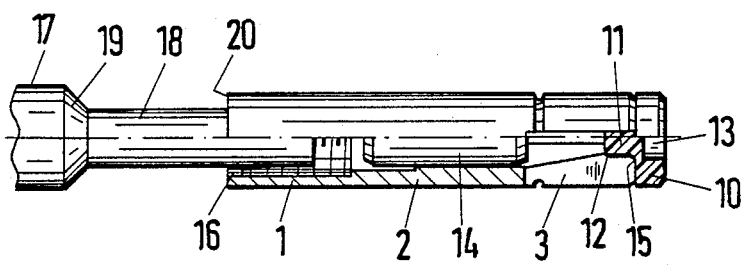
FIG 3 shows a partially cross-sectional view of an expansible plug according to the invention with a spacing element formed a plastic spacing washer.

FIG. 3 shows yet another embodiment of an expansible sleeve 2 with expansible segments 3 arranged at an end thereof. In this embodiment, a plastic washer 10 functions as a spacing element. The washer 10 is provided with tongues 11 projecting into the opening 12 of the inner bore 1 of the expansible sleeve 2. The plastic spacing washer 10 comprises a recess 13 for receiving drilling dust from the bottom of the borehole. Upon penetration of an expander bolt 14 into the expansible sleeve 2, the expander bolt 14 will impact on the plastic spacing washer 10. As a result, the tongues 11, after a while, are severed at the predetermined fracture point 15. This enables complete penetration of the expander bolt 14 into the expansible sleeve 2.

An expansible plug shown in FIG. 3 has at an end thereof which is opposite the expansible segments, a portion of an increased diameter that defines an annular groove 16. A percussion tool 17 is used for anchoring the expansible plug. The percussion tool 17 is provided with a punch 18 which drives the expander bolt 15 into the inner bore 1 of the expansible sleeve 2. When the expander bolt completely penetrates into the inner bore 1, as shown in FIG. 2, a conical marker head 19 engages the edge of opening 20 of the internal bore 1 of the expansible sleeve 2.

The length of the punch 18 is so selected that shortly before the expander bolt reaches its end position, the conical marker head engages the edge of the opening 20. Upon further impact on the percussion tool 17, the expander bolt is advanced into its end position. At that, the edge of the opening 20 is slightly widened. The widening of the edge of the opening 20 of the bore is clearly visible from outside and serves as indication that the expansible plug has been properly anchored in the borehole due to expansion of the expansible segments. Thus, the marker head 19 is used for indication of form-locking anchoring of the expansible plug in the borehole. Thus, it becomes possible to check at any time whether the expansible plug inserted in the borehole has actually expanded and is properly anchored.

Instead of the conical marker head 19, it is possible to use depressions, projections and similar marking elements which enable to provide a corresponding marking of the edge of the bore opening.

While the invention has been illustrated and described as embodied in an expansible plug to be percussion anchored in a borehole having an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansible plug to be percussion anchored in a borehole that tapers outward at an inner end thereof, said expansible plug comprising an expansible sleeve having a converging inner bore and an expansible end; expansible segment means arranged at said expanable end of said expansible sleeve and having an end side; an expander member for penetrating into said converging inner bore to expand said expansible segment means; and at least one spacing element arranged at said end side of said expansible segment means and comprising a plastic spacing washer having tongues projecting into an opening of said converging inner bore of said expansible sleeve which is defined by said end side of said expansible segment means.

2. An expansible plug as set forth in claim 1, wherein said spacing washer includes a recess.

3. An expansible plug as set forth in claim 2, wherein said tongues have predetermined rupture points at which they severe upon anchoring of the expansible plug.

4. An expansible plug as set forth in claim 1, wherein said expansible sleeve has an end remote from said expansible segment means, and a portion of an increased inner diameter at an edge of an opening of said inner bore at said remote end.

5. An expansible plug as set forth in claim 4, wherein said portion of an increased inner diameter defines an annular recess.

6. An expansible plug as set forth in claim 5, wherein said annular recess includes an outer opening having an edge for receiving markings indicating completion of anchoring of said expansible plug in the borehole.

* * * * *